(12) United States Patent
Semlitsch

(10) Patent No.: US 9,688,435 B2
(45) Date of Patent: Jun. 27, 2017

(54) TRANSPORT PALLET AND METHOD FOR THE PRODUCTION THEREOF

(71) Applicant: SECAR TECHNOLOGIE GMBH, Hoenigsberg (AT)

(72) Inventor: Karl-Heinz Semlitsch, Muerzzuschlag (AT)

(73) Assignee: SECAR TECHNOLOGIE GMBH, Hoenigsberg (AT)

( * ) Notice: Subject to any disclaimer, the term of this patent is extended or adjusted under 35 U.S.C. 154(b) by 0 days.

(21) Appl. No.: 14/779,083

(22) PCT Filed: Mar. 21, 2014

(86) PCT No.: PCT/AT2014/050071
§ 371 (c)(1),
(2) Date: Sep. 22, 2015

(87) PCT Pub. No.: WO2014/146160
PCT Pub. Date: Sep. 25, 2014

(65) Prior Publication Data
US 2016/0046406 A1 Feb. 18, 2016

(30) Foreign Application Priority Data
Mar. 22, 2013 (AT) .................... A 227/2013

(51) Int. Cl.
*B65D 19/00* (2006.01)
*B29C 65/70* (2006.01)
(Continued)

(52) U.S. Cl.
CPC .......... *B65D 19/0002* (2013.01); *B29C 65/70* (2013.01); *B29K 2075/00* (2013.01);
(Continued)

(58) Field of Classification Search
CPC ...... B65D 19/0002; B65D 2519/00034; B65D 2519/00139; B65D 2519/00273; B65D 2519/00432
See application file for complete search history.

(56) References Cited

U.S. PATENT DOCUMENTS

| 2,486,284 A | 10/1949 | Horwitz |
| 3,573,144 A | 3/1971 | Andersen |
| 5,139,845 A | 8/1992 | Beckerman et al. |
| 6,308,642 B1 | 10/2001 | Branam et al. |
| 8,776,968 B2 * | 7/2014 | Higby .................. H01Q 1/1235 191/12 R |
| 2005/0199158 A1 | 9/2005 | Looker |
| 2009/0095206 A1* | 4/2009 | Dacus .................. B29C 70/088 108/57.27 |

(Continued)

FOREIGN PATENT DOCUMENTS

| DE | 1949209 A1 | 4/1971 |
| DE | 6609559 U | 7/1972 |

(Continued)

*Primary Examiner* — Daniel Rohrhoff
(74) *Attorney, Agent, or Firm* — Laurence A Greenberg; Werner H. Stemer; Ralph E. Locher

(57) ABSTRACT

A transport pallet, in the form of a square or rectangular board, is particularly suited for air transport. The transport pallet is formed to a large extent from plastics material. It has at least two intersecting reinforcing struts formed from a fiber-reinforced composite plastics material. The reinforcing struts lie adjacent each other via notches stabilizing the relative positions, constituting a plug-type connection. The transport pallet further has a plate-like core of mechanically stable foamed plastics material formed by several part-cores. The core is attached to or surrounds the reinforcing struts and holds the same in a stable position. The foamed plastics material core is sheathed by the fiber-reinforced composite plastics layer. The lateral edges of the pallet board thus formed are reinforced by light alloy profiled members pulled over the edges.

18 Claims, 17 Drawing Sheets

(51) Int. Cl.
    *B29K 75/00*         (2006.01)
    *B29K 305/02*       (2006.01)
    *B29K 307/04*       (2006.01)
    *B29K 309/08*       (2006.01)
    *B29L 31/00*        (2006.01)

(52) U.S. Cl.
    CPC ...... *B29K 2277/10* (2013.01); *B29K 2305/02* (2013.01); *B29K 2307/04* (2013.01); *B29K 2309/08* (2013.01); *B29L 2031/7178* (2013.01); *B65D 2519/00034* (2013.01); *B65D 2519/00069* (2013.01); *B65D 2519/00129* (2013.01); *B65D 2519/00139* (2013.01); *B65D 2519/00273* (2013.01); *B65D 2519/00343* (2013.01); *B65D 2519/00432* (2013.01); *B65D 2519/00562* (2013.01); *B65D 2519/00567* (2013.01); *B65D 2519/00815* (2013.01)

(56) References Cited

U.S. PATENT DOCUMENTS

2009/0241461 A1* 10/2009 Linares .............. B65D 19/0038
                                                                     52/592.1
2012/0312951 A1* 12/2012 Leedekerken ..... B65D 19/0002
                                                                    248/346.02

FOREIGN PATENT DOCUMENTS

| DE | 2733456 A1 | 2/1979 |
| --- | --- | --- |
| WO | 0126982 A1 | 4/2001 |
| WO | 2012023849 A1 | 2/2012 |

\* cited by examiner

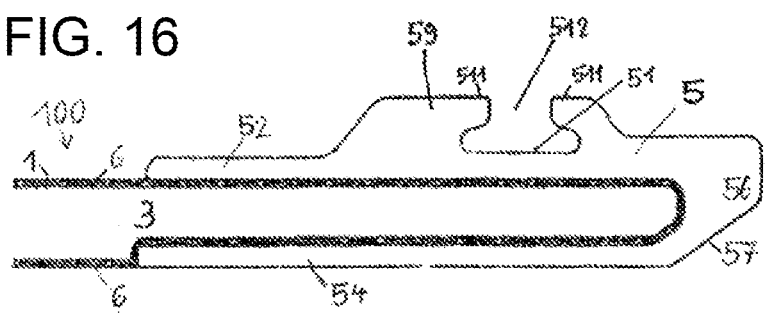
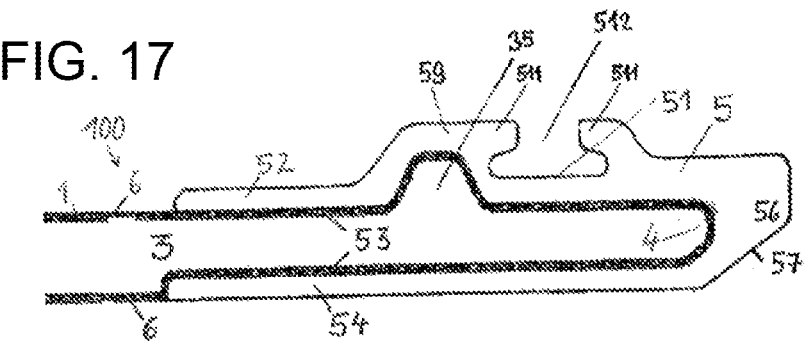

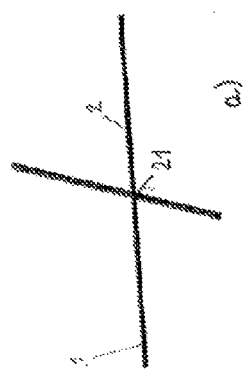
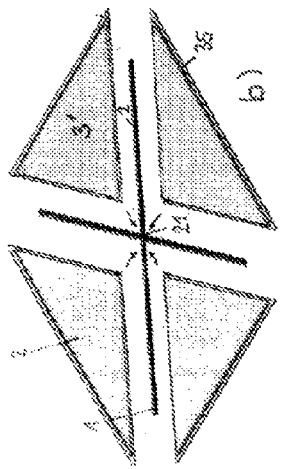
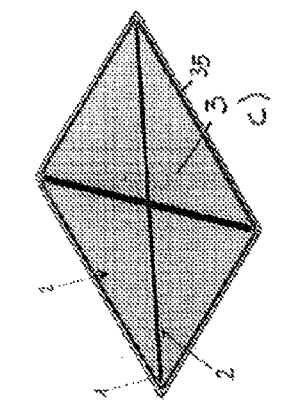
FIG. 25
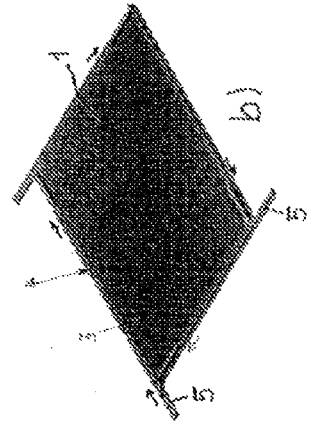
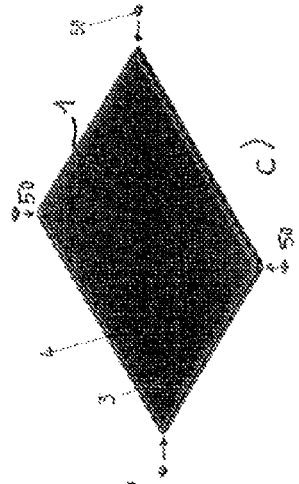
FIG. 26
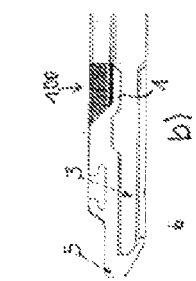
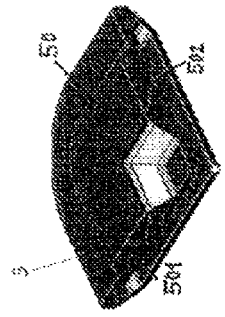
FIG. 26D
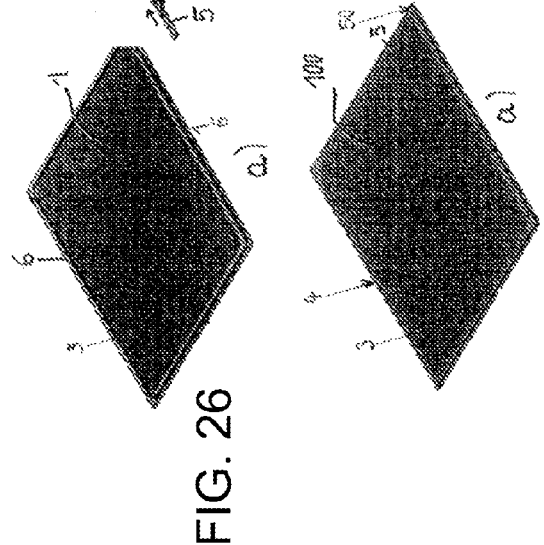
FIG. 27

TRANSPORT PALLET AND METHOD FOR THE PRODUCTION THEREOF

BACKGROUND OF THE INVENTION

Field of the Invention

The present invention relates to a new transport pallet which is particularly suitable for air transport, wherein the former has substantially the shape of a square or rectangular board, wherein, in comparison to the aluminum-based or aluminum alloy-based pallets which are being used to date for this purpose, said new transport pallet has substantially less weight or mass, respectively, and to a method for producing the same.

The widest variety of proposals for transport pallets of this type have already been put forward, the intention in particular being to reduce as far as possible the weight thereof, which after all represents a tare weight which cannot be utilized and which is of highly essential importance in particular for air transport.

BRIEF SUMMARY OF THE INVENTION

In the course of detailed experiments, a new pallet based on plastics material, which is mechanically highly stable and of high strength, has been developed.

The new transport pallet is characterized in that
said new transport pallet, in order for the weight thereof to be substantially reduced, is in substantial proportions formed by plastics material;
has at least one board-like core formed by a plurality of part-cores and from a mechanically stable foamed plastics material which is provided with a reinforcement, said pallet also having at least two reinforcement or strengthening struts or bars (strings, stringers) which intersect one another at an angle in the range of 15 to 90°, bear against one another at the respective intersection point, preferably by way of relative-position stabilizing channels or notches there for forming a plug connection, and are formed by a fiber-reinforced composite plastics material which is of high mechanical strength, said core holding said struts or bars in a stable position and arrangement with respect to one another, being bonded fully thereto, and enclosing or embedding them, or surrounding them on all sides;
to which foamed plastics material core, containing the mentioned reinforcement struts and formed by a plurality of part-cores, for forming a pallet base board at least by way of the upper and lower main face thereof at least in each case one layer, of high mechanical strength, from a fiber-reinforced composite plastics material is bonded, or else which multipartite foamed material core is entirely sheathed, that is to say beyond the peripheries thereof, by a fiber-reinforced composite plastics material layer of this type; and
in that it is preferably provided that all lateral peripheries of the pallet base board are reinforced either by profiles of light alloy, aluminum or of a high-strength aluminum alloy, which are drawn, pushed, adhesively bonded and/or incorporated into the composite plastics material there, or else are preferably drawn, pushed, reverse-drawn and/or adhesively bonded and/or incorporated thereonto.

The new pallet, which is thus to a large proportion formed by plastics material substantially having a density of approximately 1 g/cm³, as a consequence of the reinforcement bracings which are provided in the interior thereof, of the cured foamed material core, and of the hard composite upper and lower layers or sheathings, respectively, is distinguished by high mechanical stability, high load capacity, high resistance to wear, and simple handling and production.

Said new pallet is thus of great interest to any mode of transport, in particular, however, for transport by means of aircraft, since said new pallet, when compared to the transport pallets based on aluminum which have been employed to date in this field, has a weight which is around up to 40% lower, while offering at least the same flexural strength and mechanical stability as the pallets known to date.

As far as the reinforcement struts of fiber-reinforced composite plastics material, which are present in the interior of the new pallet, are concerned, it has proven advantageous for the stability of the new pallet when the mutually intersecting reinforcement struts or bars, respectively, are oriented in a substantially parallel manner with or at an angle of approx. 90° in relation to the lateral peripheries of the pallet boards, or else are oriented approximately in the direction of the diagonals of the latter.

A particularly high mechanical quality of the new pallet may be achieved when the part-cores of the foamed plastics material core which is formed by the former and which contains the reinforcement struts, or which substantially encloses or surrounds the latter, respectively, have, on those ones of their lateral flanks where said part-cores bear on the reinforcement struts, longitudinal elevations which have a cross section adapted to the cross-sectional shape of said reinforcement struts and which engage in a form-fitting manner and preferably also a materially-integral manner, for example by means of foaming or adhesive means, in corresponding lateral longitudinal depressions or flank channels, respectively, of the reinforcement struts.

As far as the reinforcement struts per se are concerned, it is favorable when the same have an optionally substantially (circular)round, elliptical, square or hexagonal cross section—at best, however, a flat or wide I-shaped cross section.

A new transport pallet is thus particularly preferred in which the reinforcement struts or bars, respectively, are configured so as to be substantially of (flat-)strip type, that is to say have a wide or flat I-shaped cross section, respectively, and preferably have depressions, indentations, notches or constrictions in the region of the intersection points.

Optionally, reinforcement bars of fiber-reinforced composite plastics material which are configured so as to be approximately of rebar type have also been proven to be particularly advantageous.

The reinforcement struts may be embodied as a completed profile (cured profiles), or it is also possible for the struts to be laid up in the pressing tool as a preform (profiles are cured only once the pressing operation is performed), respectively.

As far as the material of the reinforcement bars which in the context of the invention is particularly preferred is concerned, a particular advantage is obtained when the preferably strip-type reinforcement struts or bars, respectively, and the two external layers which cover the reinforced foamed material core on the upper and lower sides, or the sheathing layer which preferably completely sheathes the foamed material core, respectively, are/is differently or identically formed by a composite plastics material which is reinforced with glass, carbon, aramid and/or mineral fibers, in particular basalt fibers, wherein preferably the or all peripheries of the pallet board, respectively, are covered with the same composite plastics material, that is to say when the reinforced foamed material core board is completely covered with a uniform composite plastics material layer.

With respect to the foamed material core which, while having as little mass as possible, after all nevertheless substantially contributes toward the strength of the new transport pallet, in particular as a consequence of the sandwich effect, it has proven advantageous when the foamed plastics material core, which by way of a plurality of the part-cores thereof encloses the reinforcement struts or bars, is formed by a mechanically highly stable and foamed plastics material, in particular by "Rohacell", or by a plastics material based on a polyurethane.

In particular with a view to the rough loading conditions which are also encountered at airports, it should be mentioned that it has proven advantageous when the lateral peripheries of the pallet or pallet board, respectively, on the upper side are thickened on the lateral peripheries or are configured so as to be upwardly extended, respectively, specifically in that the lateral peripheral thickenings are formed by the sheathing layer from the fiber-reinforced composite plastics material, and have at least one undercut channel which is preferably open toward the top and into which a profile from a light alloy, in particular aluminum or an aluminum alloy, is drawn or pushed, respectively, adhesively bonded, embedded or incorporated; or else in that a profile from a light alloy, in particular aluminum or an aluminum alloy, which in each case thickens or strengthens the lateral peripheries, respectively, is pushed or drawn, respectively, over or onto the lateral peripheries of the pallet board which is sheathed with the fiber-reinforced composite plastics material, wherein the lower side of this profile is configured so as to be flush with the surface of the lower side of the pallet having its lower-side composite plastics material layer.

In these embodiments, the advantage of substantial stabilizing of the payload is provided by the height-extended peripheries, wherein an undercut channel profiling of the peripheries of the pallet, into which the tethers for the payload may be threaded, for example, is of particular advantage.

In the context of the invention, a transport pallet is particularly preferred in an embodiment in which the foamed material core which is formed by the part-cores which surround the reinforcement struts and which is completely sheathed with the high-strength fiber-reinforced composite plastics material, that is to say the pallet board, at a spacing from all of its peripheries and so as to run parallel therewith in a continuously longitudinal manner, has form-fitting elevations which are upwardly oriented, preferably rounded and have a trapezoidal cross section, and which cooperate in a form-fitting manner and preferably also a materially-integral manner with downwardly oriented longitudinal indentations, having a corresponding trapezoidal cross-sectional form, of the profiles from light alloy, in particular from aluminum or an aluminum alloy with high-strength properties, said profiles reinforcing and stabilizing the peripheries of the pallet base body, being drawn or pushed over the pallet peripheries and surroundingly-drawing the same.

Furthermore, it has proven favorable when the integral light alloy profiles, in particular aluminum profiles, which are in each case drawn or pushed onto the pallet base board peripheries and the pallet periphery sheathing which is formed with the high-strength composite plastics material, in each case by way of its lower-side appendage and by way of its upper-side appendage, connected to the latter by way of its peripheral edge, adjoin the periphery of the pallet base body, wherein the lower face of the lower-side appendage is flush with the planar lower side of the pallet base board, while the upper-side appendage protrudes beyond the preferably planar upper side of the pallet base body.

In the sense of simplifying fastening of the respective payload on the new pallet, a variant of the invention is advantageous, according to which it is provided that the light alloy profile which strengthens the pallet base board, on the upper side of the former, has a longitudinal undercut channel in which, from the upper side thereof, preferably circular clearances are incorporated, the extent of which clearances in the transverse direction to the course of said channel, preferably the diameter of said clearances, is larger than the mutual spacing of the two upper undercut appendages of the channel which accompany the latter.

As far as stress on the corner regions of transport pallets is concerned, the former is particularly high.

Accordingly, an embodiment of said transport pallet is preferred, which is characterized in that corner stabilizer bodies, preferably based on fiber-reinforced plastics material or aluminum, are provided for the strengthening of the corner regions of the pallet base board, which corner stabilizer bodies on their profile connector faces, which are disposed at a right angle to one another, have a similar cross-sectional shape with two appendages, which encloses the pallet boards between the appendages, to the peripheral pallet strengthening profiles of light alloy directly adjoined thereto, but optionally without the corner-guided undercut channel, wherein it is preferably provided that the actual corner region of the corner stabilizer bodies is configured so as to be rounded.

Finally, a subject matter of the invention is a method for producing the new transport pallets, which method is characterized in that the mutually intersecting reinforcement struts from the fiber-reinforced composite plastics material are brought into the respectively desired mutual position, optionally by way of their plug connections;

in that part-cores from a firm foamed plastics material and having the same corresponding shapes are introduced into the fields or interstices, respectively, between said reinforcement struts, said part-cores being positioned on the reinforcement struts so as to bear thereon and in a manner corresponding to the cross-sectional shape thereof, and ultimately preferably being adhesively or similarly bonded to the reinforcement struts and thus in total forming the reinforced foamed plastics material core;

on which for linking a plastics material prepreg is applied;

whereupon at least on both sides of the foamed plastics material core in each case one non-woven fiber reinforcement is then applied, which non-woven fiber reinforcement, after the aluminum profiles have been pushed over the lateral peripheries of the core in order for the pallet board to be formed, is impregnated with a polymer, and wherein the construction having the light alloy profiles which has been thus prepared is compressed under the influence of heat and pressure, while the completed pallet is being molded.

The invention will be explained in more detail by means of the drawing.

BRIEF DESCRIPTION OF THE SEVERAL VIEWS OF THE DRAWING

FIGS. 16 and 17, plus 18 and 19, show examples of light alloy peripheral protection profiles which result in substantial improvements of the mechanical strength of the pallets according to the invention and which are applied to the longitudinal peripheries of the pallet board and are capable of being reverse-drawn or surroundingly-drawn, respectively, onto the peripheries;

FIGS. 22 and 23 show views of a section through the pallet board in the corner region thereof, and so on;

FIGS. 25 to 27 show the complete procedure when producing the completed new lightweight pallet having a simple diagonal reinforcement with peripheral and corner protection.

DESCRIPTION OF THE INVENTION

Figure 2:
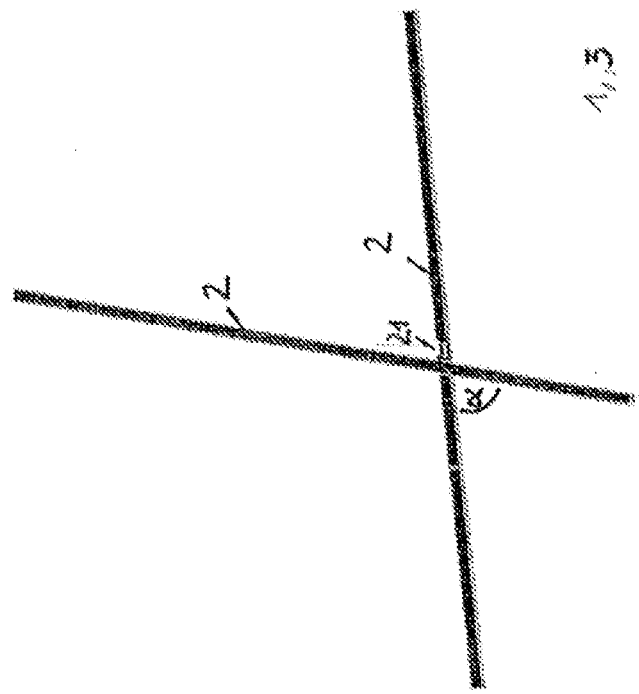
FIGS. 1 and 2 show simple embodiments or assemblies of the reinforcement struts which very substantially contribute toward stabilizing the new pallet board.
Figure 1:
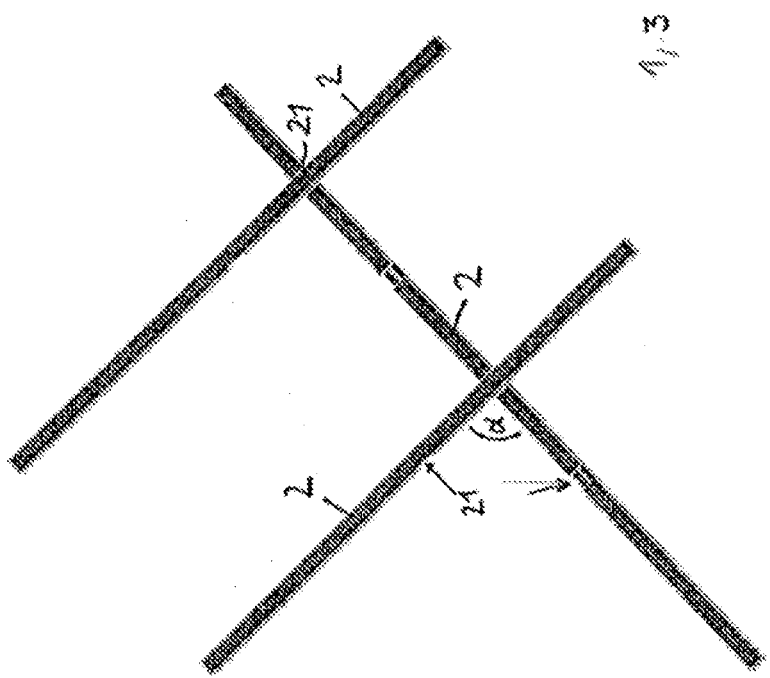

It is schematically shown in FIGS. 1 and 2 how, for example, only three or two reinforcement struts 2 from fiber-reinforced composite plastics material, which mutually intersect at 21, are disposed within the pallet base board or in the foamed plastics material core 3 thereof, wherein the reinforcement struts 2 in FIG. 2 mutually intersect at an angle α of approx. 75° and are also disposed so as to be inclined by approx. 75° toward the periphery of the pallet, while those in FIG. 1 mutually intersect at a right angle α and are oriented to be substantially in the direction of the approximately square pallet base board 1 or parallel with the diagonals thereof, respectively.

The struts 2 which are shown in FIGS. 1 and 2 terminate in a "free" manner per se in the foamed material core 3.

Figure 4:
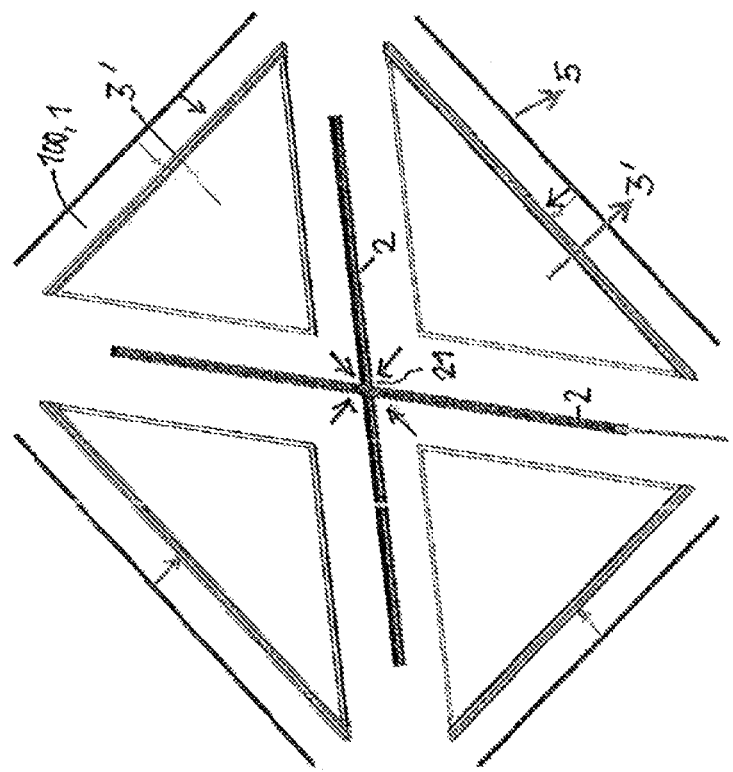
FIGS. 3, 4, and 5 and 6 show two stages of enclosing the reinforcement struts in the foamed plastics material core which is formed by a plurality of part-cores.
Figure 3:
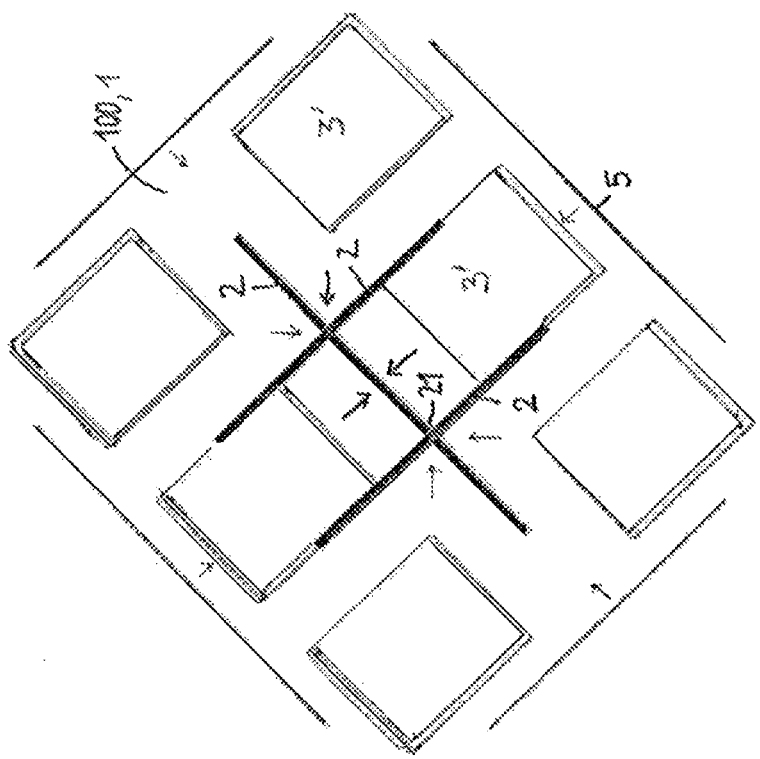

With the reference signs otherwise remaining identical, FIGS. 3 and 4 show two pallet boards 1 of the pallet 100, in each case in a first stage of their making, wherein the part-cores 3' which are to be pushed in or fitted in, respectively, between the reinforcement strut(s) 2 mutually intersecting in a stable manner, and which in their shape are in each case adapted to the shape of the faces or of the interstices, respectively, between the reinforcement struts 2, and finally form the entire pallet core 3 are illustrated before their final positioning. The foamed material part-cores 3' are adapted to the respective interstice size and in the course of the process are laid in the tool. Furthermore, the aluminum profiles 5 which form the periphery of the core 3 or of the pallet 100, respectively, are indicated in FIGS. 3 and 4.

Figure 6:
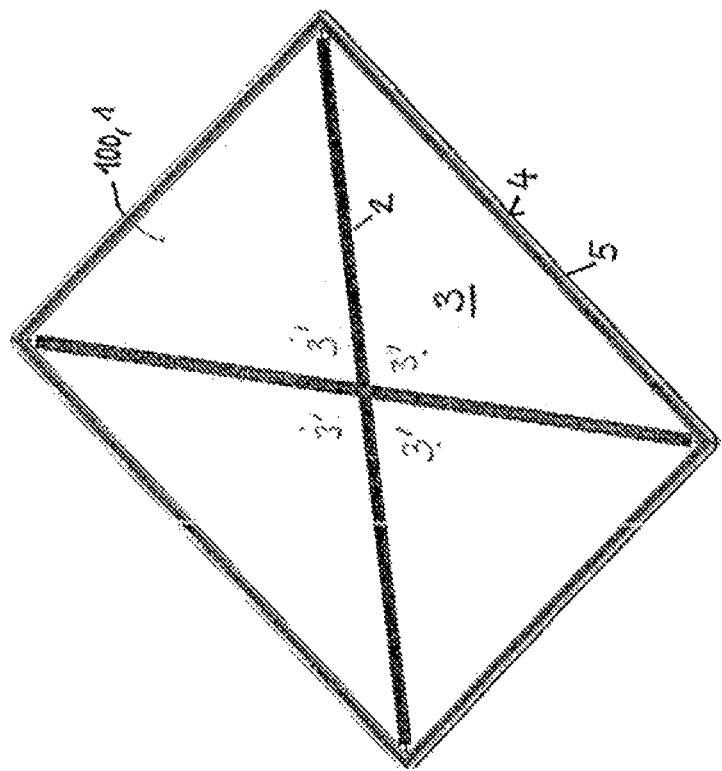
Figure 5:
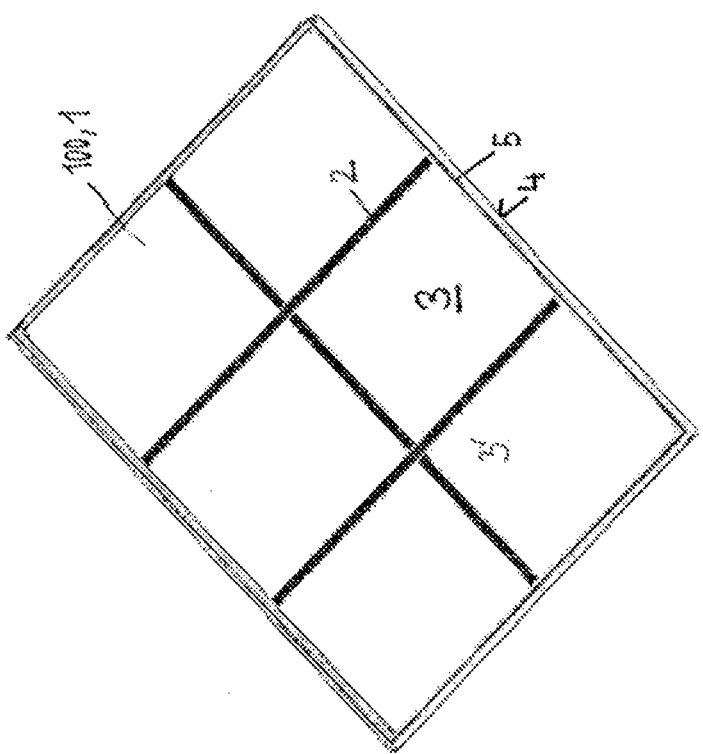

With the reference signs otherwise remaining identical, the subsequent and thus last stage of making is derived from FIGS. 5 and 6. They now show the mutually intersecting reinforcement struts 2, wherein the foamed material part-cores 3' now ultimately having their lateral flanks adapted to the cross-sectional shape of the reinforcement struts 2, firmly bear on these struts 2, and are preferably adhesively bonded thereto and thus in total form the strut-reinforced foamed plastics material core 3 of the new pallet board 1.

It can also be clearly seen from FIGS. 5 and 6 how the peripherally-reinforcing aluminum profiles 5, which are not in mutual contact in the corner regions of the future pallet 100 or of the pallet board 1, respectively, are offered up to the peripheries 4 of the future pallet board 1, for example, are pushed thereonto.

Figure 7:
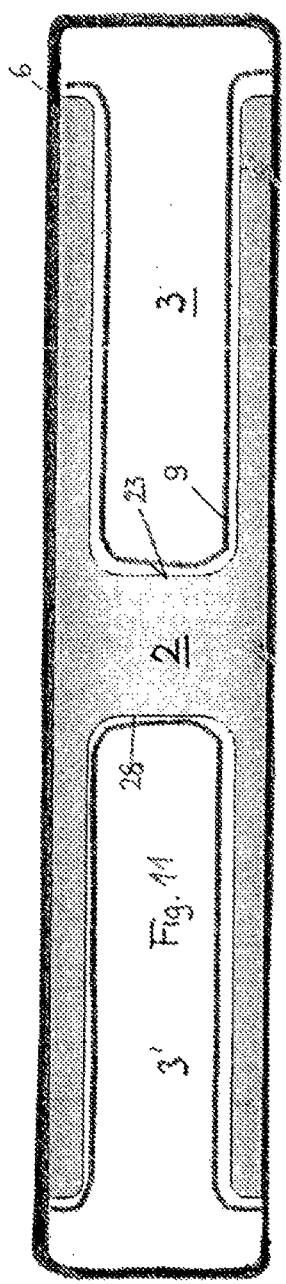
FIGS. 7 and 8 show a cross section through one of the reinforcement struts of the new transport pallet, and a plan view onto the same at the intersection points thereof.
Figure 8:
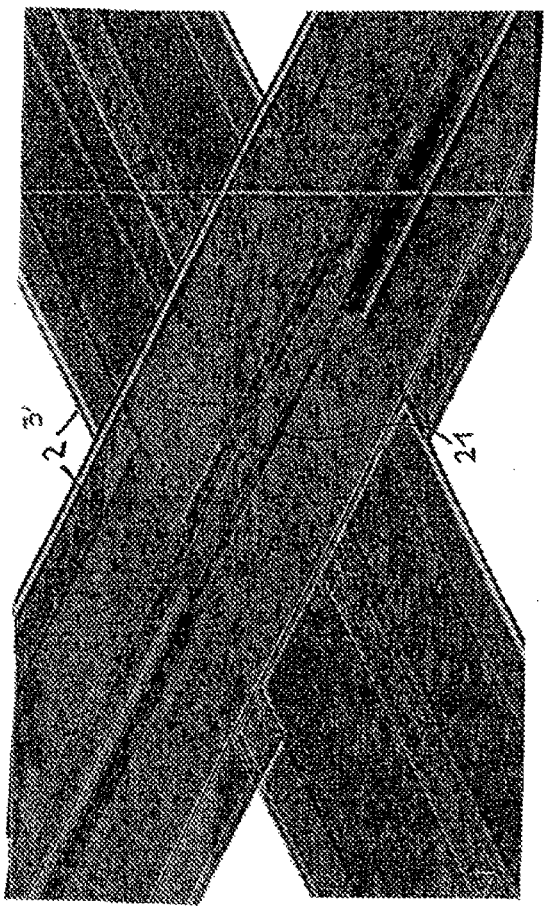
Figure 9:
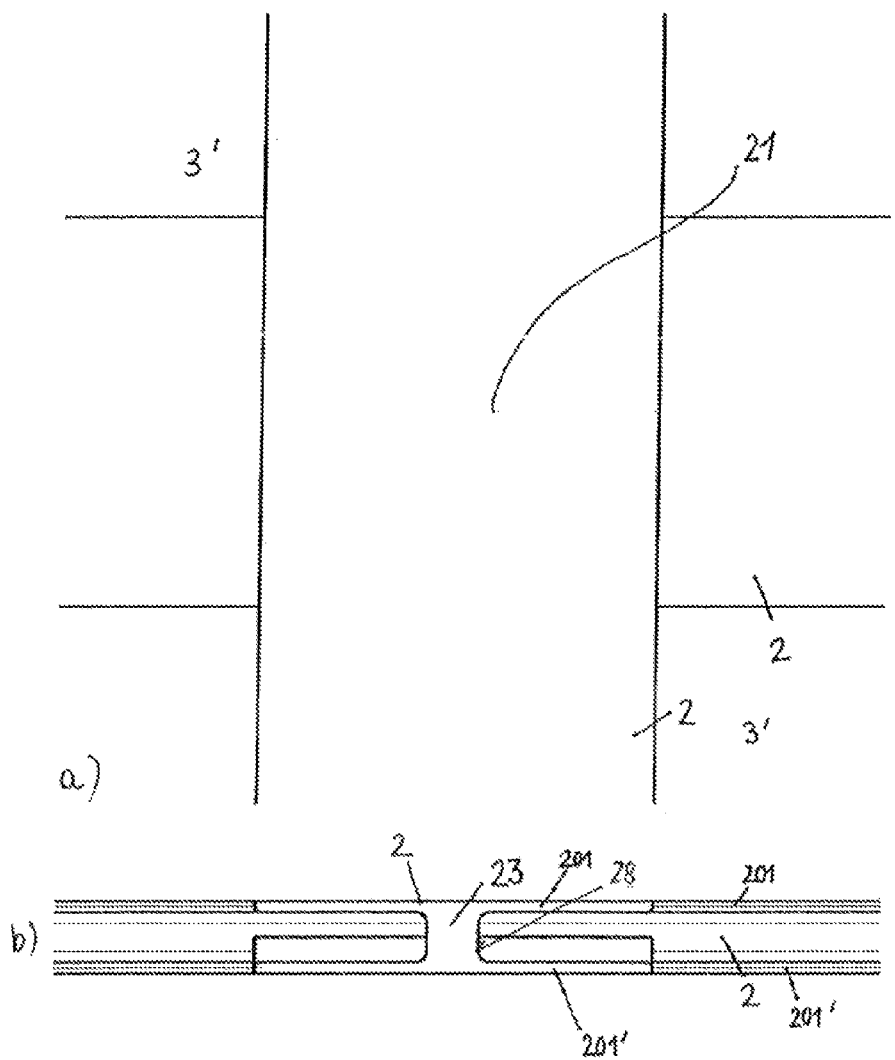
FIGS. 9 to 12 show the reinforcement struts in each case in a cross-sectional view and in a plan view.
Figure 10:
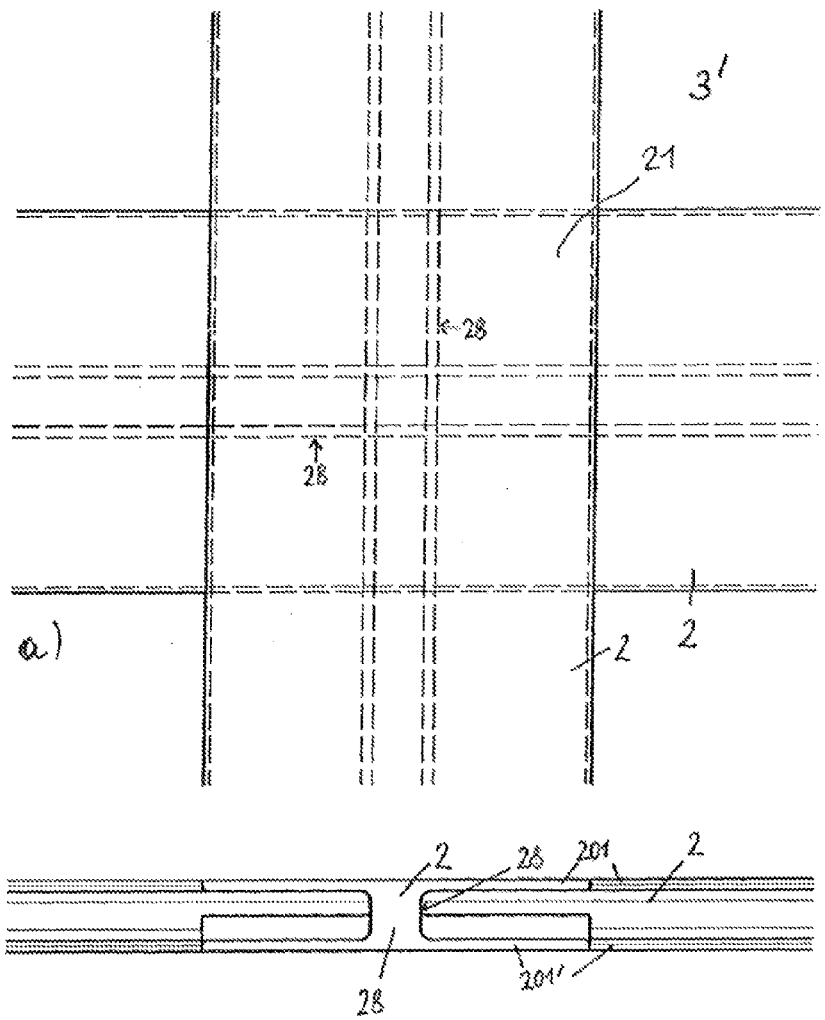
Figure 11:
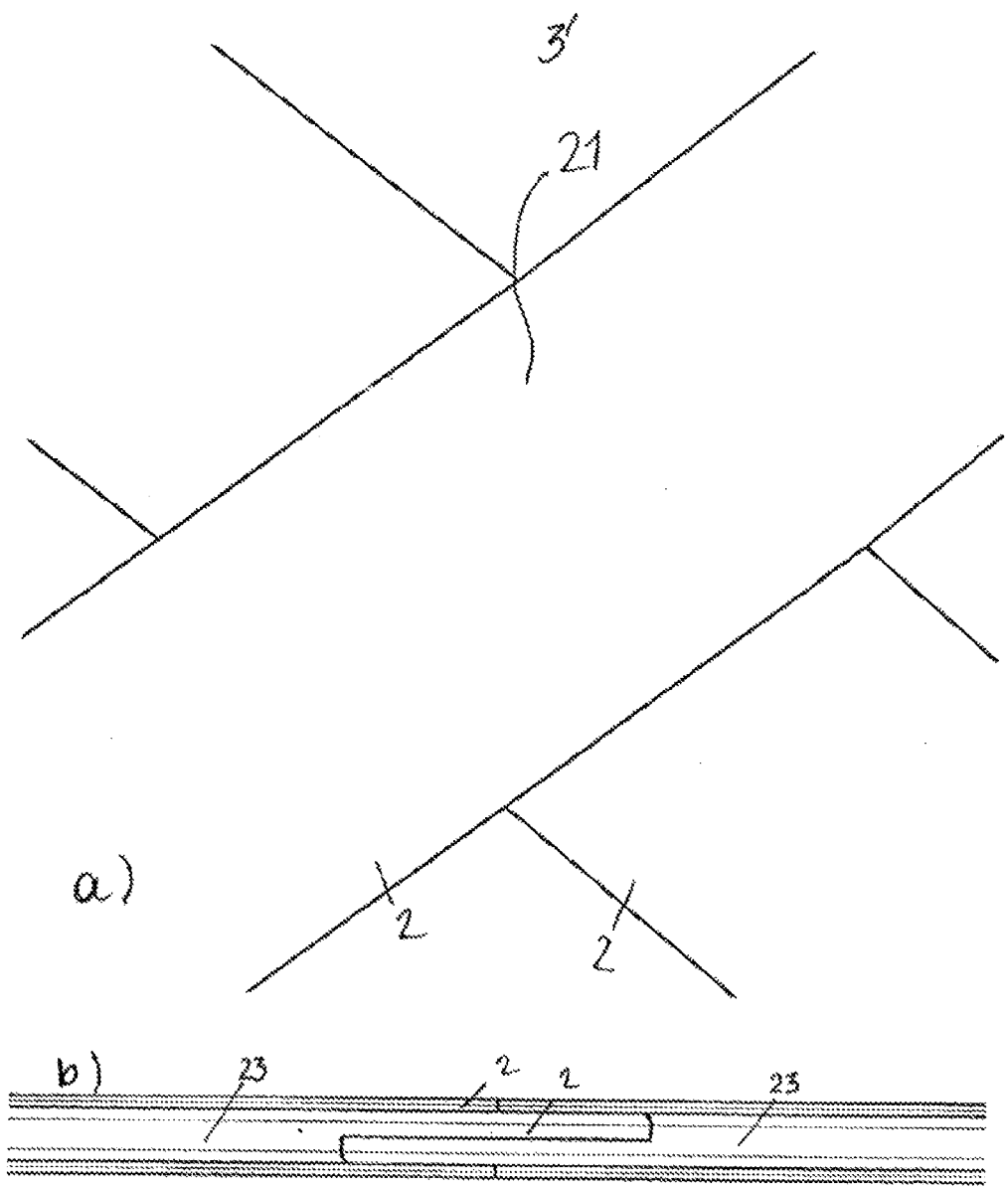
Figure 12:
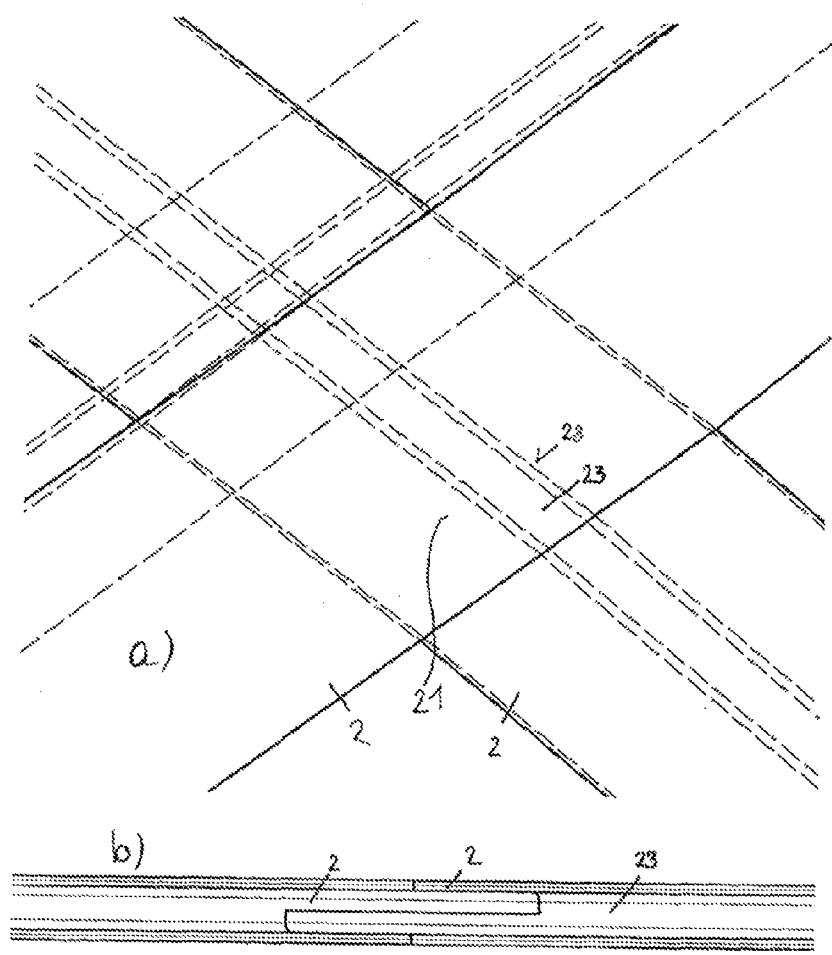

With the reference signs otherwise remaining identical, FIGS. 7 and 8 show a cross section through one of the reinforcement struts 2 having a strip-type, extremely flat or wide, respectively, I-shaped cross section, and a foamed plastics material part-core 3' which is fitted into the two lateral flank channels 28 of said cross section, wherein the longitudinal channels 28 on both sides of the flat I-shaped strip struts 2 for high-strength adhesive bonding to the foamed plastics material part-cores 3' are conceived with a prepreg 9, and a plan view onto the reinforcement struts 2 which mutually intersect at 21 and have the flat I-shaped cross section.

Furthermore, with the reference signs otherwise remaining identical, FIGS. 9 to 12 show in each case a plan view and a sectional view of the rectangular and the non-rectangular intersection regions 21 of the reinforcement struts 2 which have the flat I-shaped cross section, wherein the web 23 of the wide I-shaped cross section interconnects the upper 201 and the lower strip-type, wide and flat region 201' of the single reinforcement strut 2, and between the two strip-type regions on both sides of the reinforcement struts 2 in each case one deep trough 28 is formed, by way of which the form-fitting and optionally adhesively-assisted firm grip between the part-core 3 and the reinforcement strut 2 is ensured.

Figure 13:
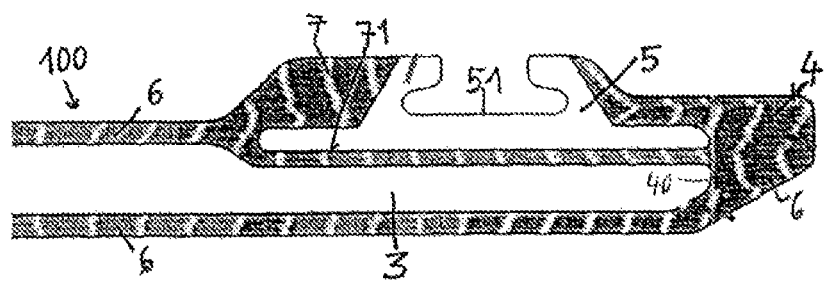
FIGS. 13 to 15 show a few potential cross sections through one of the lateral peripheries of the new pallets having the light alloy profile, in particular the aluminum profile, which runs along these lateral peripheries, substantially reduces the wear thereof, and stabilizes the periphery of the pallet board.
Figure 14:
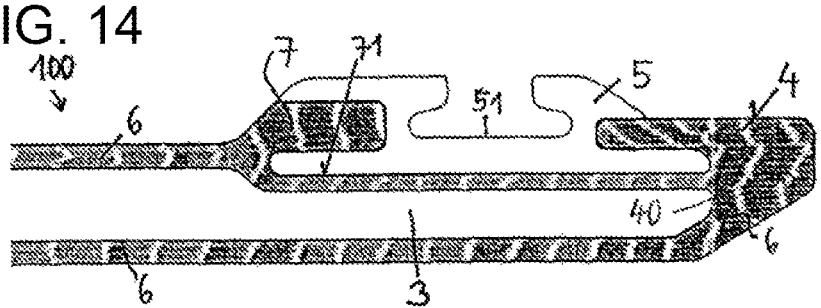
Figure 15:
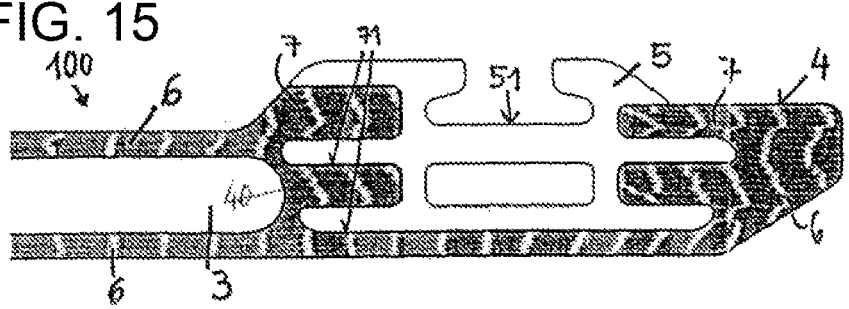

Furthermore, with the reference signs otherwise remaining identical, FIGS. 13 to 15, in each case in sectional views, within the context of the invention show three potential assemblies of the upper-side and of the lower-side reinforcement board 6 of the new pallet 100, and the (peripheral) sheathing layer 6 which here is integral with the former or formed in one piece with the former, respectively, and covers the lateral peripheries 40 of the board core 1, having at least one undercut channel 71 which is disposed in the height-increased lateral peripheral bead 7 there and into which a peripherally-reinforced light alloy profile, in particular an aluminum profile 5, is pushed, in particularly adhesively bonded or embedded by polymerization, which profile itself likewise has an undercut channel 51 for the employment of payload tethers or similar for the payload which is conveyable by the new pallet.

In the course of practical experience and of further refinements it was found that a pallet which is equipped with the bead-type thickenings 4 formed of the fiber-reinforced plastics material of the reinforcement of the pallet 100 formed by same, in particular in the case of a particularly heavy and optionally multipartite payload, is not always capable of completely meeting the high requirements of the cargo business, in particular the air cargo business.

It was found that very specifically shaped light alloy peripheral profiles 5, which are reverse-drawn across the lateral peripheries of the pallet 1 having the cover 6, 7 which extends beyond the peripheries, and are preferably bonded, for example, are ultimately adhesively bonded to the board 1, are even better in meeting the mentioned high requirements.

Figure 18:
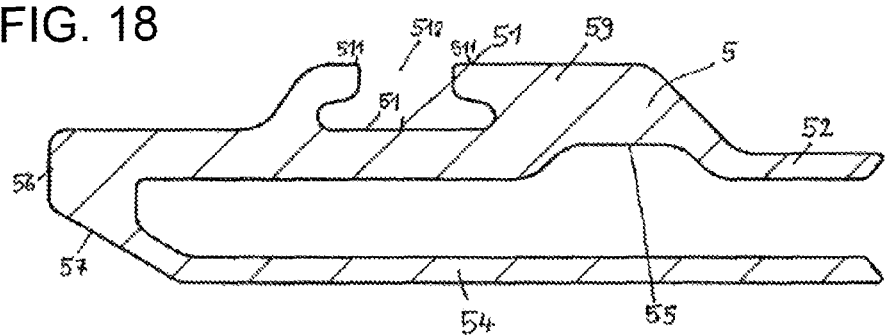

With the reference signs otherwise remaining identical, FIGS. 16 to 19 show various embodiments of the new peripheral profiles 5, wherein that one according to FIG. 16 under certain conditions bears the risk that said peripheral profile 5 in the event of the payload slipping sideways could be pulled away from the periphery of the pallet board 1, while the variant of embodiment of FIGS. 17 and 18 as a consequence of the provision of a form-fitting elevation 35 which runs parallel with the periphery and engages in form-fitting manner in a corresponding depression 55 which runs along the peripheral profile 5 and is open toward the bottom of the latter, no longer has this disadvantage which may arise under certain conditions.

The form-fitting elevation 35, which runs along the periphery/peripheries of the pallet base board 1 and which is parallel therewith, enables a true form-fitting connection to the aluminum profile 5, on account of which the total load capacity of the pallet 100 is substantially increased by way of a form-fit and an adhesive connection. It is furthermore possible for the aluminum profile to be initially secured by rivets.

The light alloy profile 5 is connected to the pallet base board 1 by form-fitting and adhesive techniques. On account of the form-fit, positioning of the completed pallet and higher total loading of the completed pallet are substantially facilitated.

With the reference signs otherwise remaining identical, the pallet periphery reinforcement profile 5 shown in FIGS. 16 to 18 is made from one piece and has an upper-side appendage 52 which by way of a peripheral body 56, here having a lower-side chamfer 57, transitions into the lower-side appendage 54. A depression 53, which laterally is flat and narrow, is open toward the pallet base board 3, and peripherally encompasses the pallet board 1 in a gully-type manner, and which has a downwardly protruding longitudinal recess 55 having somewhat rounded trapezoidal cross section, is disposed between the two appendages 52 and 54.

The high-strength core sheathing 6, which is formed by the fiber-reinforced plastics material which completely enshrouds the reinforced core 3, by way of its peripheral region 4 protrudes into the gully-type depression 53, wherein the upwardly oriented elevation 35 thereof, which has a trapezoidal cross section, protrudes in a form-fitting manner into the depression 55 of the peripheral strengthening profile 5.

The light alloy peripheral profile 5 on the upper side has an elevation 59 into which an undercut channel 51 having upper-side channel protrusions 511 which here are formed identically, are disposed so as to be mutually opposite and permit a slot 512 therebetween is incorporated.

Figure 19:
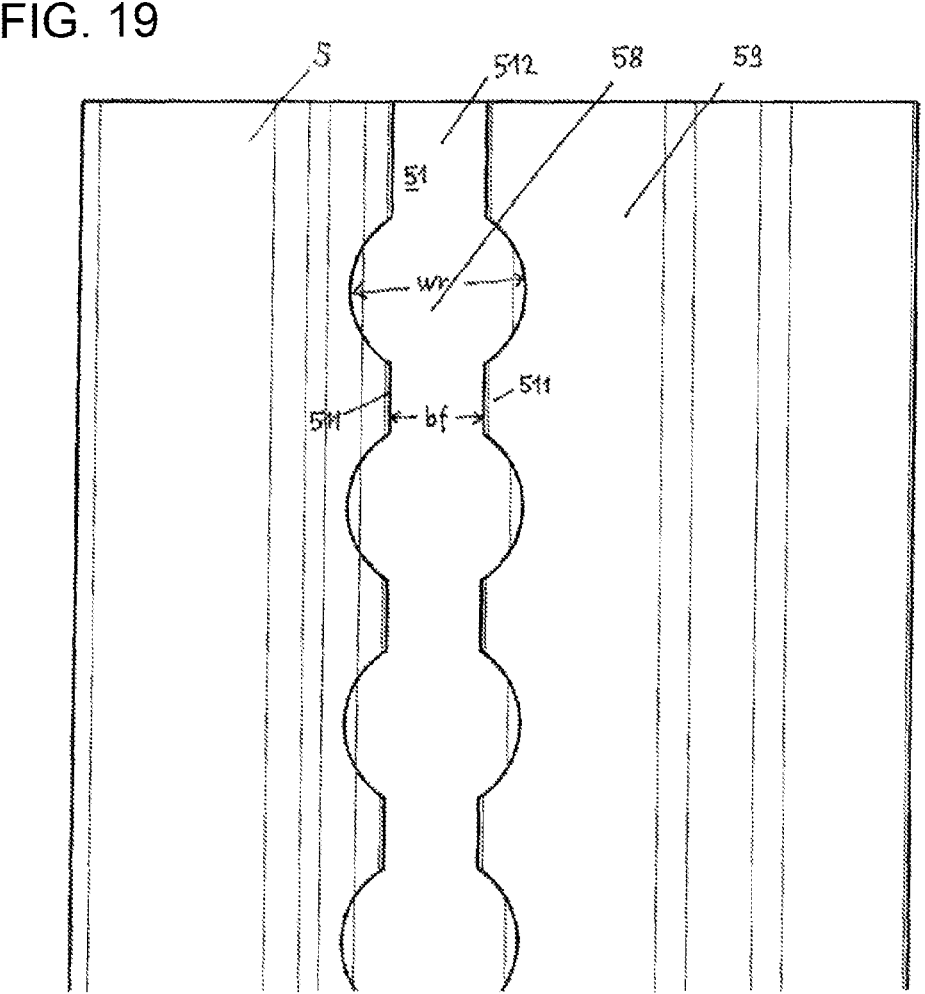

An embodiment of the undercut channel 51 of the peripheral profile 5 which is particularly preferred in the context of the invention can be seen from the plan view according to FIG. 19: spaced apart from one another, openings 58, which are circular in this case and which for their part have a transverse width wr which exceeds the width bf of the slot 512 are incorporated there in the two channel protrusions 511.

The openings 58 serve in particular for introducing strap mounting elements for the tethers of the payload which is respectively disposed on the pallet 100 into the undercut channel 51.

Figure 20:
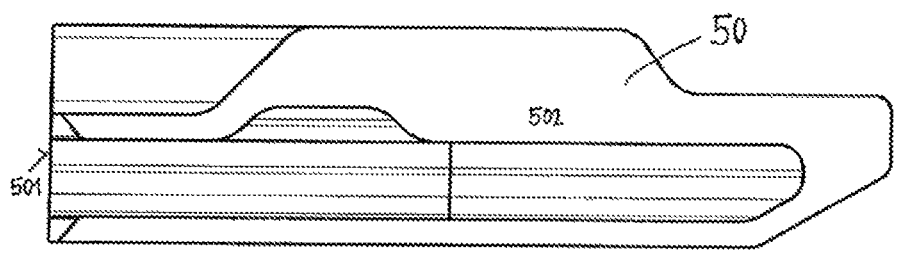
FIGS. 20 and 21 show the new corner segments which are reverse-drawn or surroundingly-drawn onto the corner regions of the pallet board.
Figure 21:
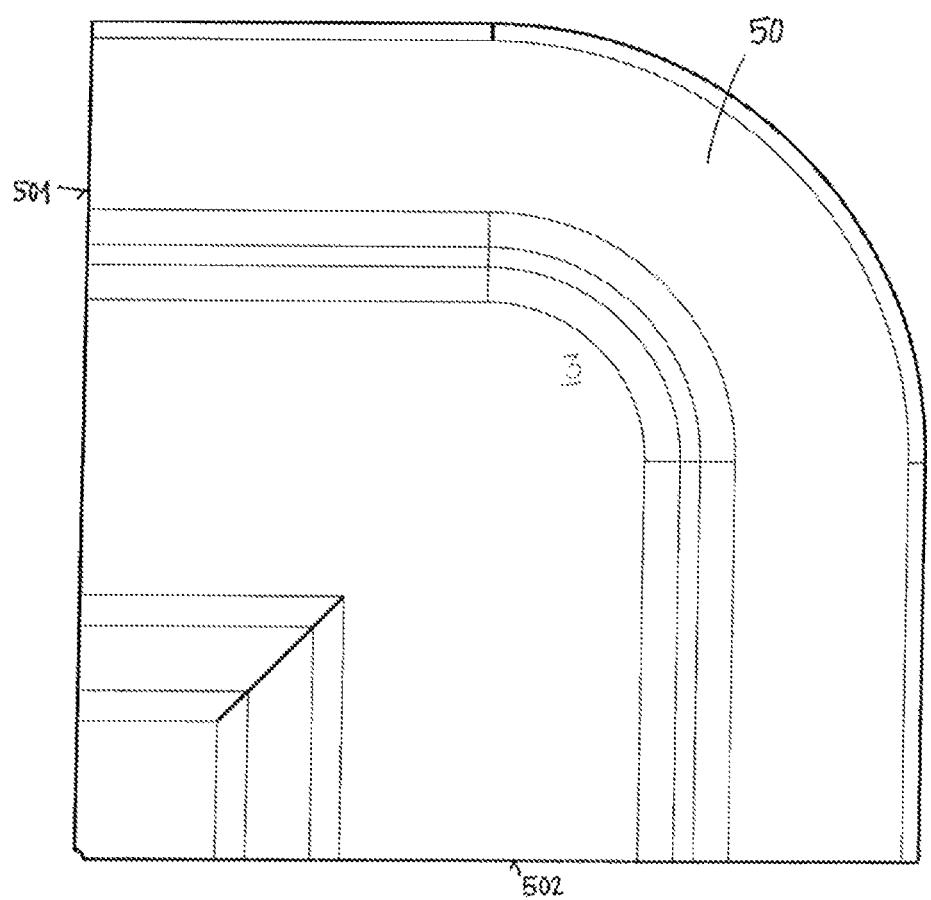

With the reference signs otherwise remaining identical, the corner segment bodies 50 illustrated in FIGS. 20 and 21 have an internal construction which corresponds to the shown cross section of the two connector faces 501, 502 which are disposed so as to be mutually perpendicular; said corner segment bodies 50 have individual characteristic constructive regions, that is to say channels, etc., which are disposed and shaped in the same way as in the light alloy peripheral profiles 5 which have been previously discussed in detail, only all these region here do not run in a straight line but in a correspondingly rounded and rectangular manner around the corner.

The corner region of the pallet board 1 which is surroundingly drawn by the corner segment 50 is implemented so as to be rounded in the same or a corresponding way, respectively.

Figure 22:
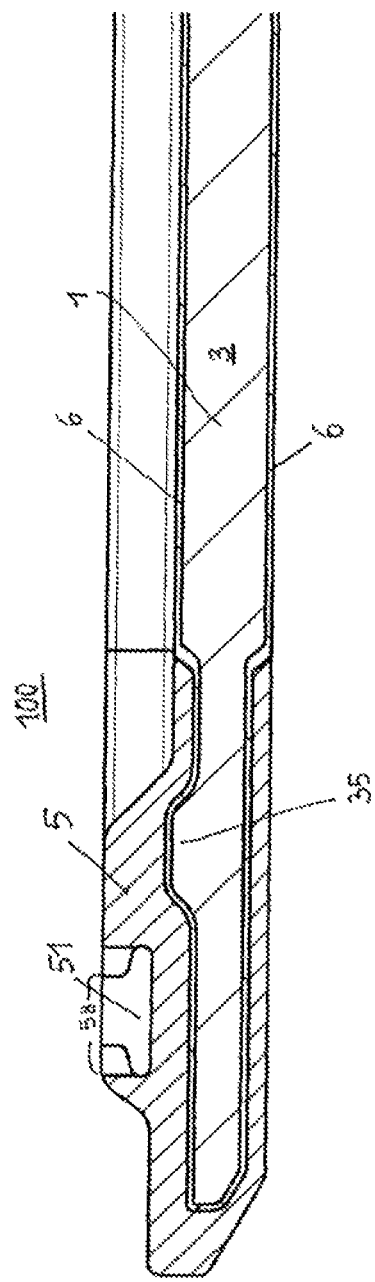
Figure 23:
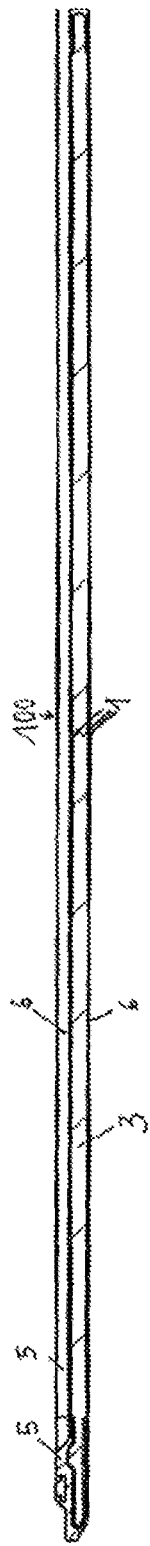

With the reference signs otherwise remaining identical, FIGS. 22 and 23 show one of the corner regions of the new lightweight transport pallet 100, or a peripheral region of the new pallet 100, respectively, in the section, having the pallet board 1 formed with the fiber-reinforced plastics material sheath 6 which overall covers the core 3 formed by foamed plastics material, and having the new corner segment 50 which is pulled across the rounded corner region thereof or the periphery thereof and which, like the peripheral strengthening profiles 5, is preferably made from the same light alloy.

Figure 24:
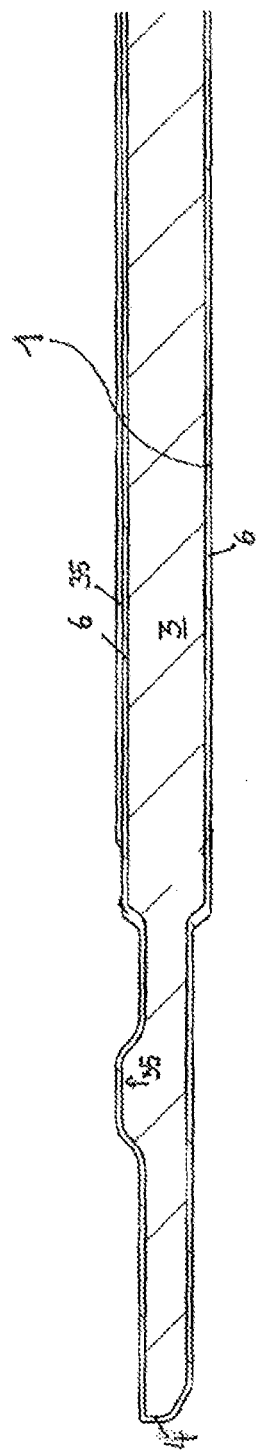
FIG. 24 shows a sectional view of the pallet board.

With the reference signs otherwise remaining identical, FIG. 24 shows the new heavy-duty pallet base board 1 in cross section, having the foamed material core 3 and an allover high-strength fiber-reinforced plastics material surround wall 6, wherein the latter may be formed with fiber-reinforced composite plastics material having a duroplastic matrix, or optionally also with silicone resin, epoxy resin, or vinyl ester resin, and furthermore also with polyethylene, polyamide, polypropylene, which for strengthening of the surface may contain a metal mesh or bodies or fibers, respectively, from a hard material, such as quartz, for example.

Figures 28, 29, 29D, 30:
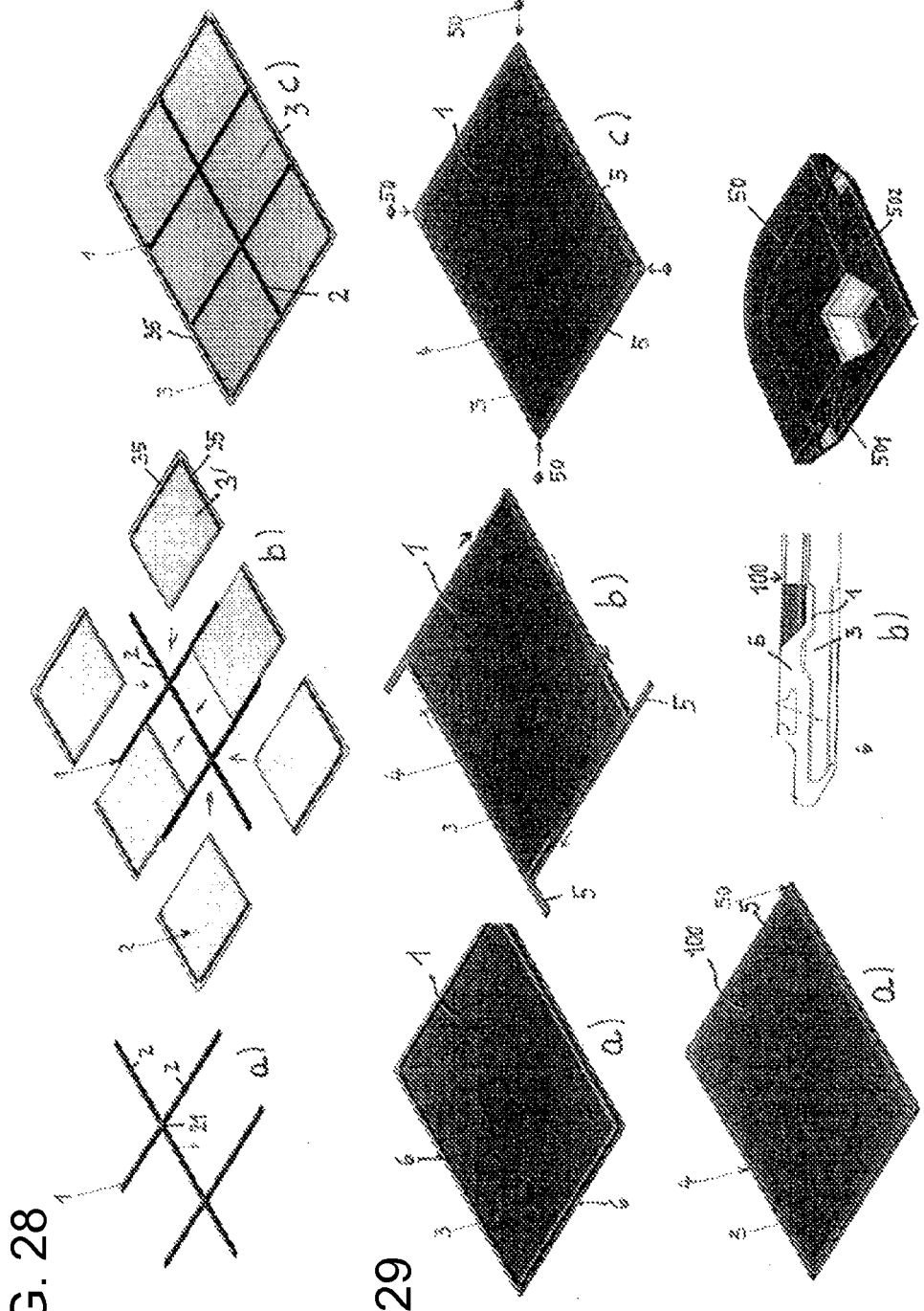
FIGS. 28 to 30 in an analogous manner show the complete procedure for producing a lightweight pallet having a multi-intersecting or mesh-like reinforcement of the pallet board, respectively.

With the reference signs otherwise remaining identical, FIGS. 25 to 30, in an analogous manner to FIGS. 3 to 6, show the complete sequence of production of the new lightweight transport pallet 100, wherein the foamed material core 3 which is equipped with the reinforcement struts 2 and is formed by the part-cores 3', see FIGS. 25*c* and 28*c*, is obtained once the making which has already been precisely described above has been performed.

A prepreg layer of a curable fiber-reinforced plastics material is applied all over this foamed material core 3 which all around has elevations 35 which are parallel with the peripheries, and the assembly thus formed is compressed to form the pallet base board 1 having the shape which has to be employed in each case and having the at least fiber-reinforced plastic sheathing which sheathes the reinforced foamed material core 3, see FIGS. 26*a* and 29*a*.

The light alloy profiles 5, which in the cross section are specially shaped, as has been described in more detail above, and which in their final positioning in each case terminate already ahead of the corner regions of the pallet board 1, that is to say are not in mutual contact there, are drawn across all peripheries of the pallet board 1, see FIGS. 26*b*, 29*b*.

The corner segments 50, see FIGS. 26*d*, 29*d*, the connector faces 501, 502 of which in each case directly adjoin the ends of the peripheral strengthening light alloy profiles 5, are plugged onto those corner regions of the pallet board 1 that in each case do not have any light alloy peripheral profiles 5, see FIGS. 26c, 29c.

The entire new lightweight pallet 100 which has been thus obtained in the described way, representing the embodiment of the corner zones thereof according to FIGS. 27b, 30b, is shown in FIGS. 27a and 30a.

The invention claimed is:

1. A transport pallet, comprising:
   a substantially square or rectangular board formed in substantial proportions thereof by plastics material and including:
   at least one board-shaped core formed of a plurality of part-cores and of a mechanically stable, foamed plastics material provided with a reinforcement, at least two reinforcement or strengthening stringers which intersect one another at an angle in a range from 15 to 90°, bear against one another at a respective intersection point, and are formed of fiber-reinforced composite plastics material having a high mechanical strength, said core holding said stringers in stable position and arrangement with respect to one another, being bonded fully thereto, and enclosing or embedding said stringers, or surrounding said stringers on all sides;
   at least one layer of high mechanical strength bonded to said foamed plastics material core, bonded to each of an upper and a lower main face thereof for forming a pallet base board, said at least one layer being formed from a fiber-reinforced composite plastics material, or a fiber-reinforced composite plastics material layer of high strength sheathing said foamed material core entirely and beyond the peripheries thereof; and
   a reinforcement for lateral peripheries of said pallet base board formed by profiles of light alloy, aluminum or a high-strength aluminum alloy.

2. The transport pallet according to claim 1, wherein said stringers bear against one another at said intersection points by way of relative-position stabilizing channels or notches for forming a plug connection.

3. The transport pallet according to claim 1, wherein said reinforcement profiles are drawn, pushed, adhesively bonded or incorporated into the composite plastics material at the lateral peripheries, or drawn, pushed, reverse-drawn or adhesively bonded or incorporated thereonto.

4. The transport pallet according to claim 1, configured for air transport.

5. The transport pallet according to claim 1, wherein said stringers are mutually intersecting reinforcement struts or bars oriented substantially parallel with or at an angle of approx. 90° in relation to the lateral peripheries of the pallet base board, or oriented in a direction of the diagonals thereof.

6. The transport pallet according to claim 1, wherein said part-cores of said foamed plastics material core which is formed by said part-cores and which contains said stringers in the form of reinforcement struts, or which substantially encloses or surrounds said struts, respectively, are formed with longitudinal elevations, on those ones of their lateral flanks where said part-cores bear on said reinforcement struts, said longitudinal elevations having a cross section adapted to a cross-sectional shape of said reinforcement struts and engaging with a form-fit in corresponding lateral longitudinal depressions or flank channels, respectively, of said reinforcement struts.

7. The transport pallet according to claim 6, wherein said longitudinal elevations engage the corresponding lateral longitudinal depressions or flank channels in a materially-integral manner by foaming or adhesive.

8. The transport pallet according to claim 1, wherein said stringers are reinforcement struts or bars having a substantially strip shape with a wide or flat I-shaped cross section, respectively, and are formed with depressions, indentations, notches or constrictions in a region of said intersection points.

9. The transport pallet according to claim 1, wherein said stringers are reinforcement struts or rebars.

10. The transport pallet according to claim 1, wherein said stringers are strip-shaped reinforcement struts or bars, respectively, and said external layers which cover said reinforced foamed material core on the upper and lower sides, or the sheathing layer which sheathes said foamed material core, respectively, are formed by a composite plastics material which is reinforced with fibers selected from the group consisting of glass fibers, carbon fibers, aramid fibers, and mineral fibers, and wherein peripheries of said pallet board are covered with the same composite plastics material.

11. The transport pallet according to claim 1, wherein said foamed plastics material core, which by way of a plurality of the part-cores thereof encloses said stringers in the form of reinforcement struts or bars, is formed by a mechanically stable and foamed plastics material or by a plastics material based on a polyurethane.

12. The transport pallet according to claim 1, wherein lateral peripheries of said pallet or pallet board, respectively, on the upper side are thickened on the lateral peripheries or are configured so as to be upwardly extended, and
   the lateral peripheral thickenings are formed by the sheathing layer of the fiber-reinforced composite plastics material, and have at least one undercut channel that is open toward the top and into which a profile from a light alloy is drawn, pushed, adhesively bonded, embedded, or incorporated; or
   a profile from a light alloy which in each case thickens or strengthens the lateral peripheries, respectively, is pushed or drawn, respectively, over or onto the lateral peripheries of the pallet board which is sheathed with the fiber-reinforced composite plastics material, wherein a lower side of said profile is configured so as to be flush with a surface of the lower side of said pallet having its lower-side composite plastics material layer.

13. The transport pallet according to claim 1, wherein said pallet board that includes said foamed material core which is formed by said part-cores that surround said reinforcement struts and which is completely sheathed with said high-strength fiber-reinforced composite plastics material, at a spacing from all of its peripheries and so as to run parallel therewith in a continuously longitudinal manner, has form-fitting elevations which are upwardly oriented and which cooperate in a form-fit with downwardly oriented longitudinal indentations, having a corresponding trapezoidal cross-sectional form, of the profiles from light alloy, said profiles reinforcing and stabilizing the peripheries of said pallet base body, being drawn or pushed over the pallet peripheries and surroundingly-drawing the same.

14. The transport pallet according to claim 13, wherein the integral light alloy profiles which are in each case drawn or pushed onto the pallet base board peripheries and the pallet periphery sheathing which is formed with the high-strength composite plastics material, in each case by way of a lower-side appendage thereof and by way of an upper-side appendage thereof, connected to the latter by way of a peripheral edge thereof, adjoin the periphery of said pallet base body, wherein a lower face of said lower-side appendage is flush with the planar lower side of said pallet base board, while said upper-side appendage protrudes beyond the upper side of said pallet base body.

15. The transport pallet according to claim 13, wherein said light alloy profile for strengthening said pallet base board, on the upper side thereof, is formed with a longitudinal undercut channel in which, from the upper side thereof, clearances are incorporated, the extent of said clearances in a transverse direction to a course of said channel, is greater than a mutual spacing of said two upper undercut appendages of said channel which accompany the latter.

16. The transport pallet according to claim 1, which comprises corner stabilizer bodies provided for strengthening the corner regions of said pallet base board, said corner stabilizer bodies, on profile connector faces disposed at a right angle to one another, have a similar cross-sectional shape with two appendages, which enclose said pallet boards between said appendages, and which directly adjoin the peripheral pallet strengthening profiles of light alloy, and wherein the corner regions of said corner stabilizer bodies are rounded.

17. A method for producing a transport pallet, the method which comprises:

placing mutually intersecting reinforcement struts of a fiber-reinforced composite plastics material into a respectively desired mutual position;

introducing part-cores of a rigid foamed plastics material having the same corresponding shapes as fields or interstices between said reinforcement struts, said part-cores being positioned on the reinforcement struts so as to bear thereon and to correspond to a cross-sectional shape thereof, to ultimately be bonded to the reinforcement struts and thus in total forming the reinforced foamed plastics material core;

applying a plastics material prepreg for attachment;

applying on both sides of the foamed plastics material core in each case one non-woven fiber reinforcement, which non-woven fiber reinforcement, after aluminum profiles have been pushed over the lateral peripheries of the core in order for a pallet board to be formed, is impregnated with a polymer, and wherein the construction having the light alloy profiles which has been thus prepared is compressed under the influence of heat and pressure, while the completed pallet is being molded.

18. The method according to claim 17, which comprises producing the pallet according to claim 1.

* * * * *